May 28, 1940.  C. F. BURROUGHS  2,202,140
INJECTION MOLDING APPARATUS
Filed Aug. 4, 1936    6 Sheets-Sheet 1
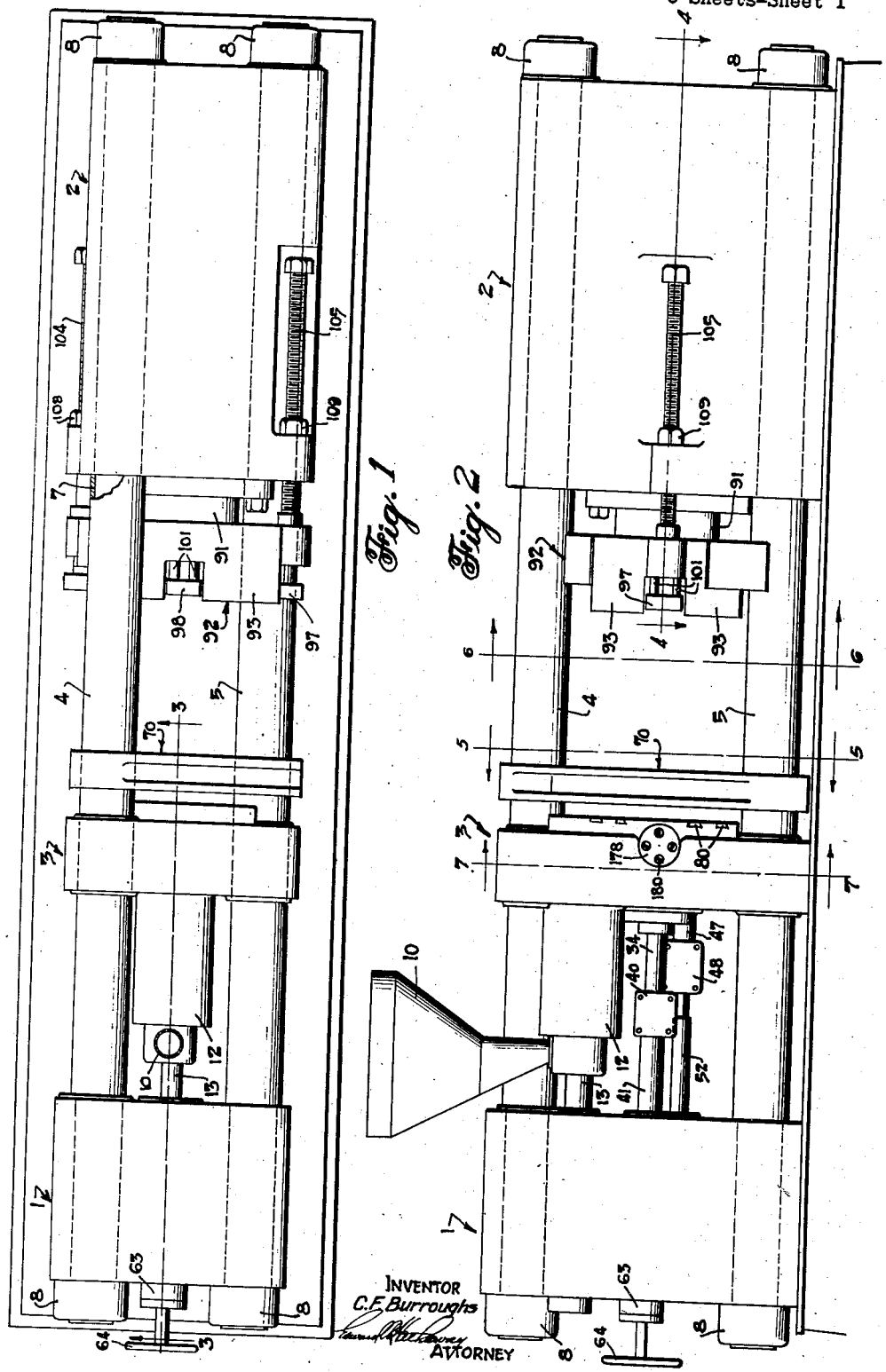
INVENTOR
C.F. Burroughs
ATTORNEY

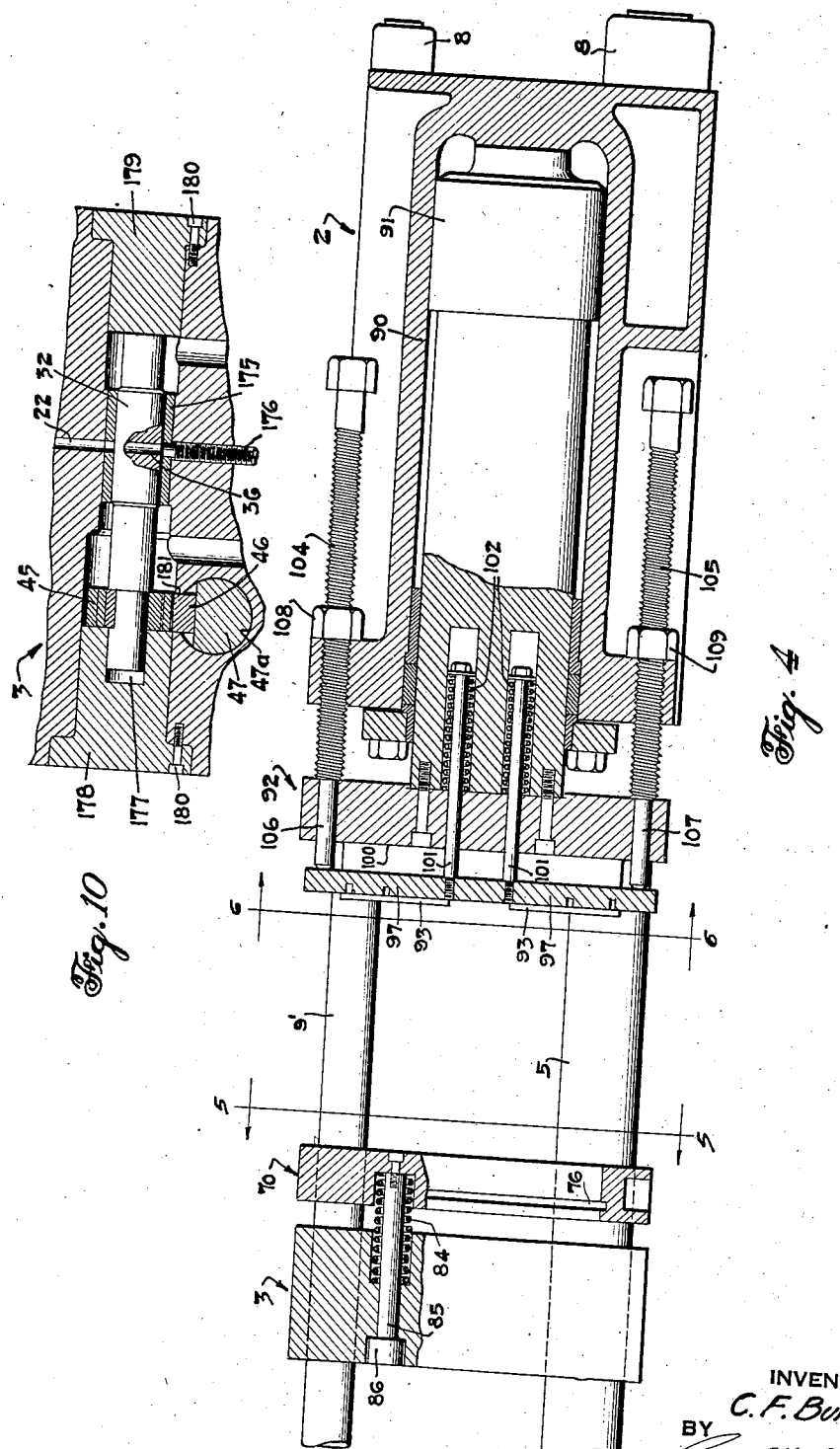

May 28, 1940.  C. F. BURROUGHS  2,202,140
INJECTION MOLDING APPARATUS
Filed Aug. 4, 1936  6 Sheets-Sheet 4
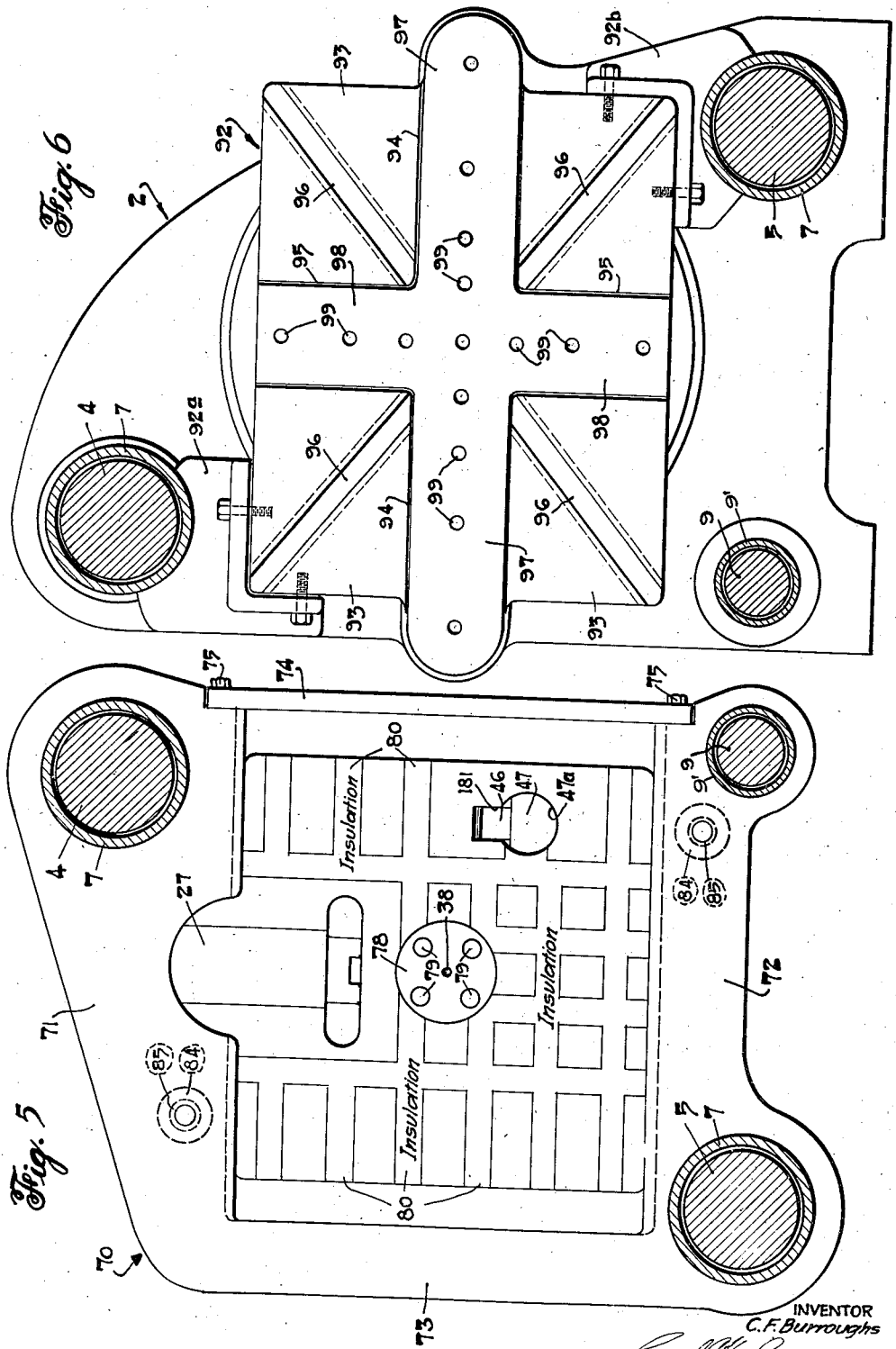
INVENTOR
C. F. Burroughs
ATTY.

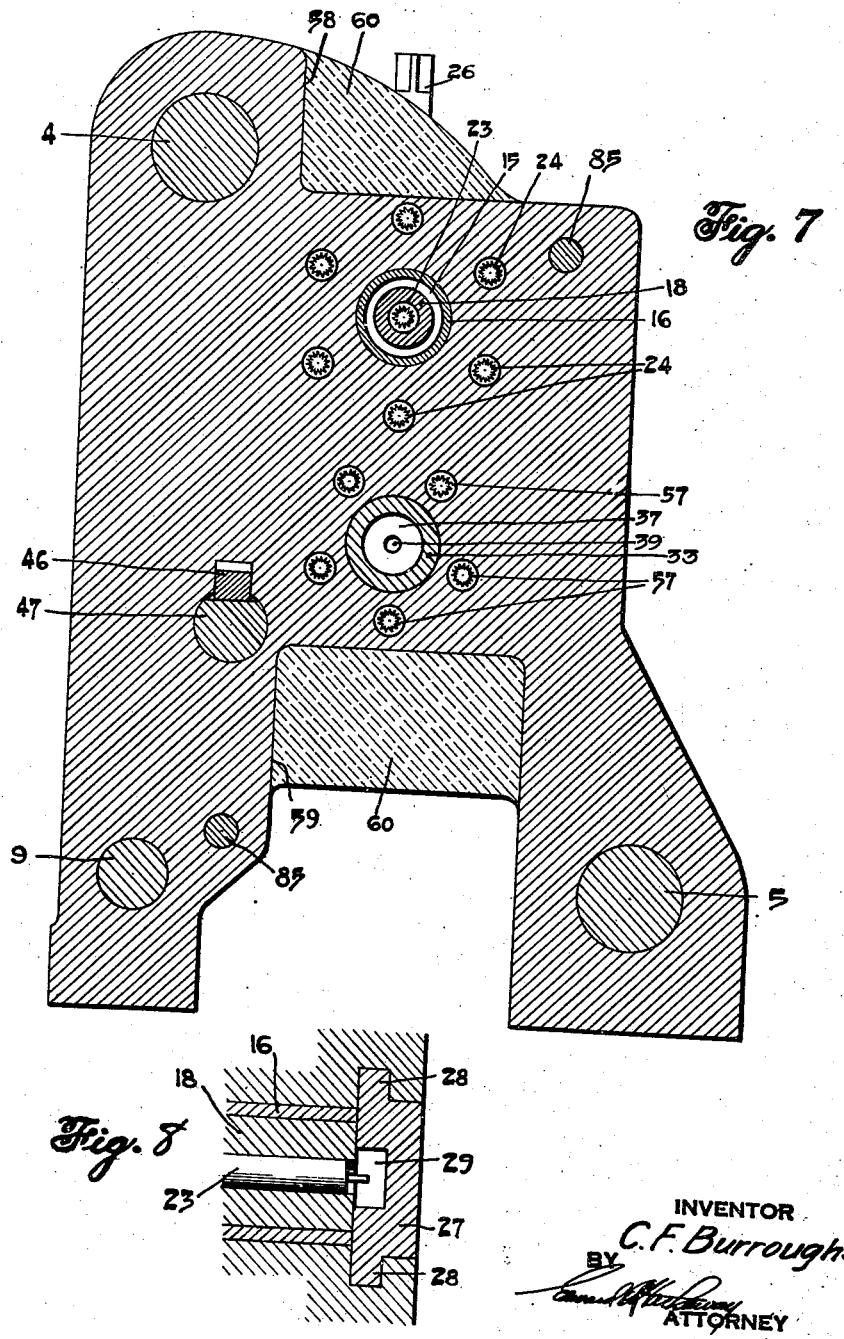

Patented May 28, 1940

2,202,140

UNITED STATES PATENT OFFICE 2,202,140

INJECTION MOLDING APPARATUS

Charles F. Burroughs, East Orange, N. J.

Application August 4, 1936, Serial No. 94,251

10 Claims. (Cl. 18—30)

This invention relates to improved injection molding apparatus and methods that are particularly applicable to injecting thermoplastic material into cooled closed molds.

Various types of injection molding machines and methods have heretofore been proposed and used, but the same have certain deficiencies involving among others inconvenience or inefficiency of operation or limited flexibility in adapting the machines to a wide variety of applications either as to the forms of products produced or as to the volumetric and pressure control required for such products.

It is an object of my invention to provide an improved machine constructed and arranged so as to be conducive to economical manufacture, maintenance and operation together with convenience and flexibility of use whereby articles may be rapidly produced with uniform density and surface lustre.

It is a further object of my invention to provide an improved combination of elements and construction thereof whereby the machine has an improved mode of automatic operation. A further object is to provide in such a machine improved time control means whereby uniform results in the operation of the machine are obtained notwithstanding variable conditions that might be momentarily or permanently involved during normal use of the machine in the successive production of a given article or different articles.

A further object is to provide an improved construction that is sturdy, thoroughly dependable and is efficient and convenient in operation combined with accessibility to the parts. As a result, thermoplastic and phenolic condensation material may be injected into the mold at an exceedingly high rate and under correct pressure. Other objects are: to provide improved means for varying the volume of material to a predetermined amount so that it bears a definite relation to the volume of the mold; to provide an improved preheating chamber and combined measuring and injection chamber with improved means for controlling communication therebetween and therefrom; to provide improved means that prevent material entering the mold under comparatively low pressure and congealing therein before the material is injected into the mold under correct pressure conditions and to continuously maintain this pressure on the material to amalgamate the same in the mold and thereby produce a uniform density and a high surface lustre of the molded article; and to provide an improved mold carrier and stripping mechanism and control therefor that will permit rapid discharge of the molded articles and rapid alignment of an empty mold preparatory to receiving further material.

In one specific aspect of the invention I accomplish certain of the foregoing improved results by employing hydraulically operated means for forcing material through a preheating chamber and into a combined measuring and injection chamber from which the material is injected into a closed mold by hydraulically operated means, the communication between said chamber and between said injection chamber and mold being so controlled and coordinated in an improved manner with maximum flow speed of the material and uniform density of the finished products.

Other objects and advantages will be more apparent to those skilled in the art from the following description of the accompanying drawings in which:

Fig. 1 is a plan view of the machine;

Fig. 2 is a side elevation thereof;

Fig. 4 is a horizontal fragmentary sectional view of the mold end of the machine taken substantially on the line 4—4 of Fig. 2;

Fig. 5 is an enlarged transverse section taken substantially on the lines 5—5 of Figs. 2 and 4;

Fig. 6 is a similar view taken on the line 6—6 of Figs. 2 and 4;

Fig. 7 is a transverse section taken substantially on the lines 7—7 of Figs. 3 and 2;

Fig. 8 is an enlarged horizontal fragmentary section taken substantially on the line 8—8 of Fig. 3;

Figure 3:
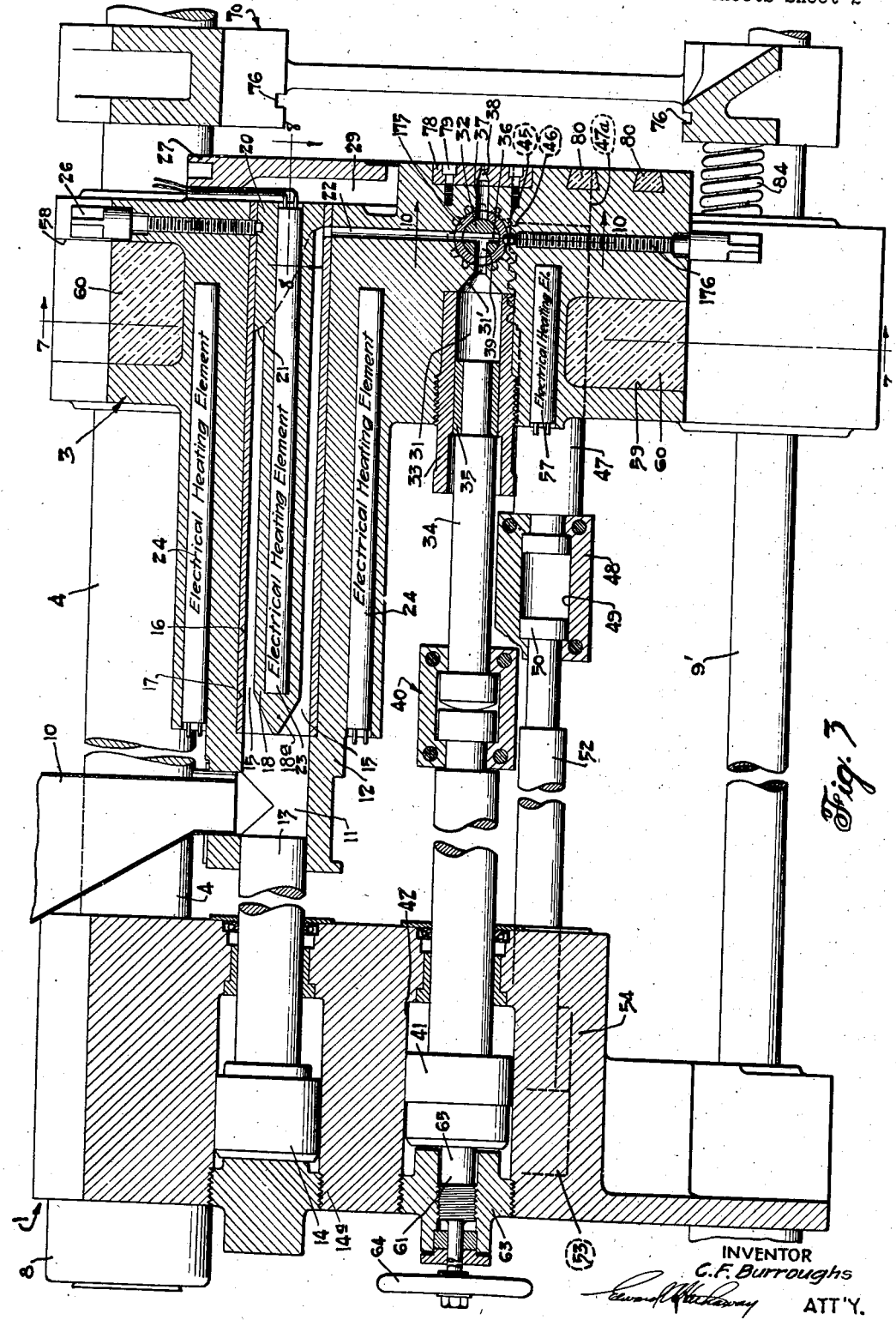
Fig. 3 is an enlarged vertical sectional view of the injection end of the machine taken substantially on the line 3—3 of Fig. 1, parts being foreshortened or broken away to show a more complete relation of parts.
Figure 9:
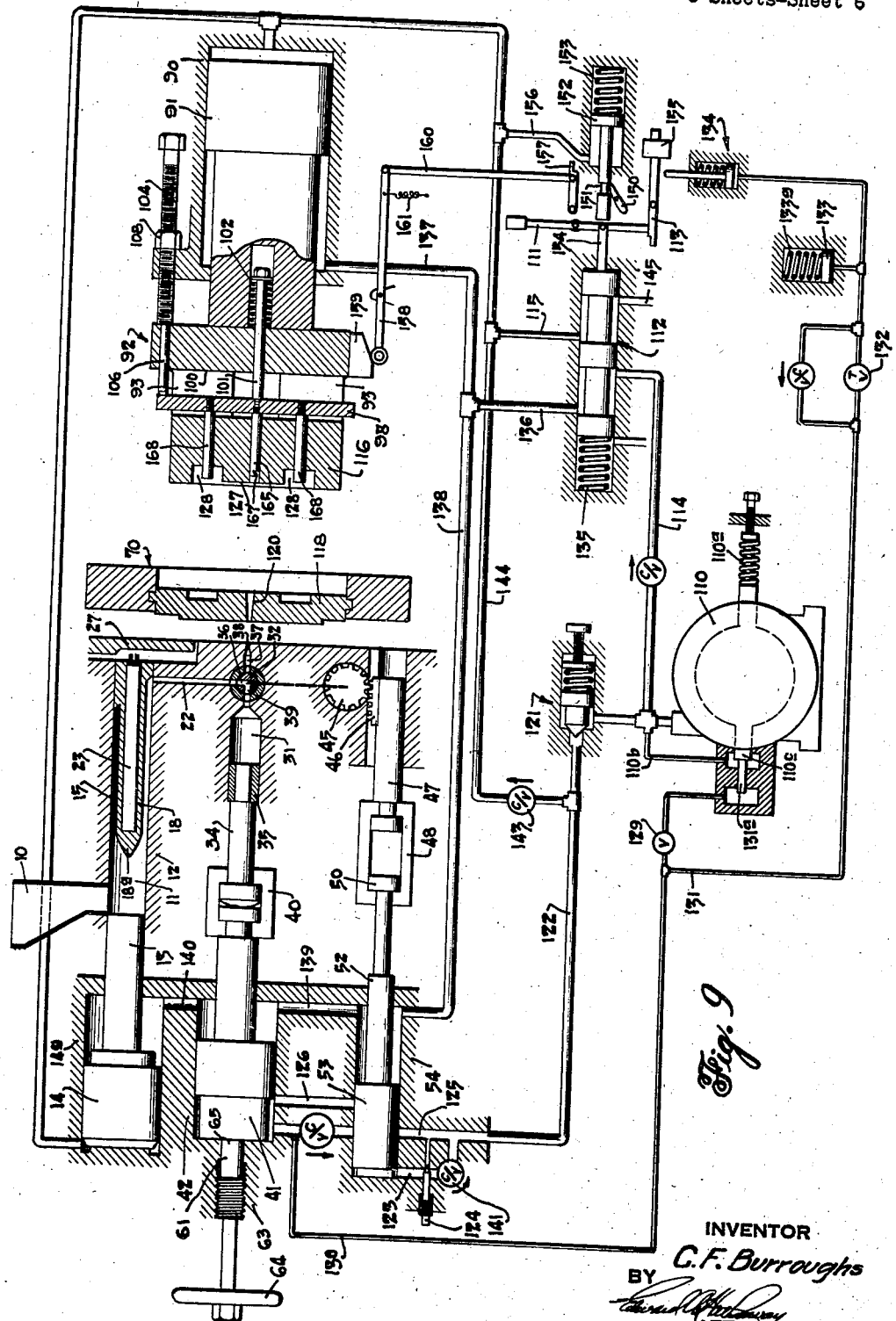

Fig. 9 diagrammatically illustrates the relation of operating and control elements;

Fig. 10 is a vertical transverse section taken on line 10—10 of Fig. 3.

The particular embodiment of the invention which is shown herein merely for the purpose of illustrating one specific form among possible others that the invention might take in practice, is especially applicable to injection molding of thermoplastic or phenolic condensation products although it will of course be clear that under certain circumstances and conditions the machine may be applicable to other types of materials.

As shown in the side elevation of Fig. 2, my improved machine generally comprises a stationary housing 1 containing a series of material operating rams while another stationary housing 2 is provided for a mold operating ram. An intermediate stationary chamber housing 3 contains preheating and injection chambers to be presently described. These three housings are held in fixed relation to each other by a pair of side rods or columns 4 and 5 which as shown in Fig. 6 are diagonally located one at the bottom corner of the machine and the other at the upper corner, thereby providing maximum accessibility to the molding elements as hereafter disclosed. Sleeves 7 surround the rods as generally indicated in Fig. 1 to form spacers between the various housings 1, 2 and 3 while side-rod nuts 8 clamp the housings and spacers together. To assist in maintaining the housings parallel to each other, a third joining rod 9 connects the housings at their lower corner opposite to rod 5. Suitable spacing sleeves 9' separate the housings. The rod 9 is of smaller diameter than rods 4 and 5, as the former functions to steady the housings whereas the latter primarily carries the load forces.

Thermoplastic material such as powdered cellulose acetate is placed in a hopper 10, Figs. 2 and 3, which communicates with a preheating chamber 11, this chamber being formed in a cylindrical member 12 projecting from and formed as part of the intermediate housing 3. A plunger 13, moved by a double acting hydraulically operated ram 14 located in a cylinder 14a, is adapted to push material through an annular space or passageway 15 constituting a part of said preheating chamber. This passageway is formed preferably by a cylindrical sleeve 16 received in an enlarged recess 17 of member 12 while an internal cylindrical heating core 18 having a tapered nose 18a is supported as at 20 in the right end of sleeve 16. The annular passageway thus formed terminates in an inclined shoulder 21 to direct material forced through passageway 15 into a passage 22 which communicates with an injection chamber to be described. Suitable heating means, preferably an electrical heating element 23 such as a resistor or the like, is positioned within core 18 so as to uniformly heat the same through its length. Also a series of electrical heating elements 24, specifically shown as six in number in Fig. 7 although any other number may be employed, are arranged concentrically to annular passageway 15. As a result of the foregoing construction and arrangement of the preheating chamber and heating means, I have found that the material may be rapidly and uniformly heated throughout to a highly satisfactory state of flux, this being accomplished in an extremely compact structure whose minimum surface contact with the material insures maximum flow speed thereof with minimum power. The leads for the heating elements 24 extend through the left end of housing 12, while the leads for heating element 23 terminate at the right end of core 18. This core and its sleeve 16 may be conveniently and readily removed by first unscrewing a pin 26 which is normally received in openings in sleeve 16 and core 18 to hold the same in a predetermined angular position, and then vertically removing a keeper block 27, Figs. 3 and 8. As shown in Fig. 8, this block has wedging flanges 28 receivable in complementary grooves of the housing and arranged to overlap a portion of the outer end of sleeve 16 and core 18, thereby to positively hold the same in position. A vertical channel 29, open at the top and bottom, receives and protects the lead wires for heating element 23 without in any way interfering with the convenient removal of the keeper block and subsequent removal of sleeve 16 and core 18.

The molding material is forced from annular chamber 15 into passage 22 and thence into an injection chamber 31, Fig. 3, through a suitable valve mechanism preferably in the form of a three way rotary cylindrical valve 32. This valve when in the position as shown in Fig. 3 permits material to be forced into the injection chamber which is preferably formed by a sleeve 33 having removable threaded connection with housing 3. The chamber wall terminates in a conical end 31' to direct the material into certain of the T-shaped valve passages. A plunger 34 having a removable wearing sleeve 35 is adapted, upon 90° counterbalance rotation of valve 32 from its position shown in Fig. 3, to force material through valve passageway 36, passage 37 and a relatively small injection orifice 38 into a suitable mold held in position adjacent said orifice. When valve 32 is rotated to its injection position as just above described, the third valve passage 39 is closed in its down position. Plunger 34 is connected by a suitable split clamp 40, to a double acting ram 41 located in a cylinder 42.

Valve 32 is provided with a pinion 45 which meshes with a rack 46, this rack being formed with a rod 47 suitably guided by a bore 47a in housing 3. A lost motion split connecting clamp 48 is positively secured to rod 47 and is provided with a cylindrical bore 49 to receive a head 50 formed on a rod 52, whereby rod 47 is moved to the right only after rod 52 has moved forwardly for substantially the length of bore 49. Piston rod 52 is operated by a double acting ram 53 disposed within a cylinder 54 referred to more fully in the description of the diagrammatic view of Fig. 9.

To maintain the material in a heated condition when forced into the injection chamber 31, a second series of heating elements 57 are provided in concentric relation to injection chamber 31 as is shown most clearly in Fig. 7. To further insure uniform heating or fluxing of the material, the housing 3 is provided with suitable recesses 58 and 59 at the top and bottom in which suitable insulation 60 is disposed.

To regulate the volume of material to be injected at any one stroke by plunger 34, the length of its stroke is controlled by an adjustable stop 61, Fig. 3, having threaded engagement with a cylinder head 63 and operated by a hand wheel 64 whereby a forward projection 65 on stop 61 is adapted to engage piston 41 and thus limit the extent of rearward piston movement. Hence by suitable adjustment of hand wheel 64, it is possible to obtain a predetermined volumetric capacity of the injection chamber and this adjustment may be effected at any time in a very simple and effective manner.

A mold carrier 70 (Figs. 3, 4 and 5) comprises as shown in Fig. 5 a cast U-frame having horizontal parallel sides 71 and 72 with a connecting portion 73 at the closed end of the U. This frame is slidably supported at three of its corners on sleeves 7, 7 and 9, Fig. 5. The open end of the U is provided with a vertically removable keeper strip 74 bolted as at 75 to the parallel legs 71 and 72. As shown in Figs. 3 and 4, the mold carrier 70 has grooves 76 to receive suitable tongues on a mold frame which will be more fully referred to later in Fig. 9 but which is omitted from the other figures for sake of clarity. By first removing the keeper member 74, Fig. 5, a mold frame may be slid horizontally through the open side of the U-shaped mold carrier 70. Hence it will be understood that whatever mold, die or other appliance or arrangement is to be used in connection with molding a given product, the same is supported in the mold carrier and held tightly against the injection orifice 38, this orifice preferably being formed in an insert 78 removably held in position by a series of screws 79, Fig. 3. It will of course be understood that the mold is suitably cooled by circulation of water through usual cooling passages therein, but to further assist in maintaining the mold cool when placed adjacent the housing 3, there is provided a series of insulation pads 80 in the face thereof. Hence flow of heat from housing 3 to the mold is materially retarded.

To automatically operate the molds and strippers, I have provided an improved combination operated in cooperation with the preheating and injection chamber operations. To this end, the mold carrier 70 is normally biased to the right, Figs. 3 to 5, by upper and lower springs 84, Fig. 5, interposed between intermediate housing 3 and mold carrier 70. To limit the extent of separation of these two members, bolts 85 arranged coaxial with said springs are secured at one end to the mold carrier and slidably guided in housing 3. An enlarged head 86 on pin 85 provides a limit stop for the separating action of springs 84. The forward end of a double acting hydraulic ram 91, which is disposed within a cylinder 90, Fig. 4, carries a complemental die or mold platen 92. Upper and lower blocks 92a and 92b, bolted to diagonal corners of platen 92, slide on sleeves 7, 7 to prevent rotation of the platen. This platen has four forward projections 93, Figs. 4 and 6, located in each quadrant and spaced apart to form horizontal recesses 94 and vertical recesses 95. Each of the projections is provided with diagonal T-shaped bolting slots 96 for securing the molding structure thereto. Disposed within the horizontal and vertical slots 94 and 95 is a stripper pin support having horizontal and vertical arms 97 and 98 provided with a series of openings 99 to receive stripper pins at any desired position. The stripper support is normally biased into contact with the bottom 100 of recesses 94 and 95, Fig. 4, by rods 101 and springs 102 supported within recesses in ram 91. To effect a stripping operation, a pair of rods 104 and 105 are adjustably threaded in suitable ears or flanges of housing 2 so that said rods are supported in a very sturdy manner by this relatively large housing and are compactly arranged relative to cylinder 90. The forward ends of rods 104 and 105 have smooth portions 106 and 107 slidably projecting through suitable openings in support 100 for abutting engagement with the back side of horizontal stripper arms 97. The rods 104 and 105 are firmly held in position by lock nuts 108 and 109 after the bolts have been properly adjusted. The operation of the ram 91 and associated elements including the stripper and mold support and rods 104 and 105, as used in connection with one particular form of mold construction, will be more apparent from the description of operation.

*Operation and control system.*—With the parts in the position as shown in Fig. 9, molding material feeds by gravity from hopper 10 into the preheating chamber 11, the plunger 13 being in its withdrawn position. To start the press, a suitable positive displacement continuously driven pump 110 is started. This pump is of the well-known variable displacement Hele-Shaw type wherein an adjustable spring 110a biases the pump pistons toward maximum displacement. A hand lever 111 is then moved to shift control valve 112 to the left wherein it is held by a pivotal latch 113. Pump pressure fluid is thus discharged through a pipe 114 to a pipe 115 and thence simultaneously to mold operating cylinder 90 and cylinder 14a. Movement of ram 91 in a left direction will cause support 92 and any suitable spacer 116 carried thereby to move forwardly together with the stripper support 97, 98. As this forward movement progresses, the spacer 116 engages the mold section 118 which is supported in the mold carrier 70. After mold sections 116 and 118 come into engagement, the latter is then moved forwardly into contact with the face of intermediate housing 3, it being understood that a suitable sprue passage 120 registers with the injection orifice 38. While the foregoing mold closing operation is taking place, material filling ram 14 is moving to the right, thereby forcing material through the annular space 15 of heating chamber 11 and thence through passage 22 and valve 32 into injection chamber 31. By this time the mold will be fully closed and firmly held in position by a substantially predetermined pump pressure in cylinder 90, and this pressure will likewise be maintained on plunger 13 so as to exert a continuous pressure on the material in the injection chamber 31. Said predetermined pressure is effected by reason of pump pressure being transmitted through a pipe 110b to move to the right a pump stroke adjusting piston 110c, thereby decreasing the pump stroke in accordance with the adjustment of spring 110a. Substantially upon occurrence of said predetermined pump pressure, pressure responsive means such as an adjustable spring-controlled distributing valve 121 will open, thereby admitting said predetermined pump pressure through a pipe 122 and an adjustable needle valve controlled passage 123 to the left end of cylinder 54. Rod 52 will thereupon gradually move to the right until the lost motion in connection 40 is taken up. During the period of time required to take up said lost motion connection, the plunger 13 is exerting a continuous force on the material in the preheating and injection chambers 11 and 13 so that there will be ample time for the plastic material to creep into a more uniformly compact mass. It will be understood that the initial movement of plunger 13 is relatively rapid and that it slows down as the material compresses and flow thereof takes place through the heating chamber and into the injection chamber. Thus the lost motion connection and valve 124 constitute a timing means for the heating of the material in passing through annular space 15 and for the filling operation of injection chamber 31. This timing may be varied by adjusting needle valve 124. Upon completion of the timing operation above described, ram 53 will have uncovered passage 125, thereby permitting an unrestricted supply of pump fluid into cylinder 54 to rapidly move rods 52 and 47 and rack 46 to the right. Pinion 45 is thus rotated 90° counterclockwise to close passage 22 and connect injection chamber 31 with orifice 38. Immediately upon the completion of rotating the valve through 90°, a passage 126 is opened by ram 53 to permit pump fluid to flow freely from passage 125 directly through cylinder 54 and passage 126 to cylinder 42, thereby immediately moving injection plunger 34 to the right and causing the plastic material in chamber 31 to be injected through sprue passage 120, gates 127 and into the mold cavities 128 under a full pressure head. The article is thus molded. It will of course be understood that in molding thermoplastic material, the mold is cooled by circulation of water through mold passages in a manner well understood in the art.

If it is desired to operate the injection plunger under a pressure lower than the mold closing pressure, then a normally closed shut-off valve 129 is opened whereupon pump pressure admitted to injection operating cylinder 42 is transmitted through pipe 130 and the now opened valve 129 to exert a force on a pump adjusting piston 131a and thereby supplement the pressure on piston 110c to further reduce the piston displacement and accordingly reduce the pump pressure. This reduced pressure is now the injection operating pressure. It will be noted, however, that the pressure on the mold ram 91 and filling ram 14 is maintained at the higher pressure by reason of check valve 143 closing when the pump pressure is reduced. Thus it is possible to maintain a maximum mold closing force under all conditions.

Upon completion of the molding operation, the machine is automatically reversed by pressure in injection power cylinder 42 being transmitted through control pipes 130 and 131 and through a throttle valve 132 to raise a time delay piston 133 which is biased downwardly by a spring 133a. When piston 133 has risen to its full height, fluid pressure then raises a spring pressed plunger 134 to engage latch 113 and release the same whereupon a spring 135 moves control valve 112 to the right. It will be understood that the spring of plunger 133 is weaker than the spring of plunger 134 thereby permitting the former to rise ahead of plunger 134 and create a definite timing action. When valve 112 is moved to its right position as shown and as just previously mentioned, pump pressure then flows from pipe 114 to pipe 136 and thence through pipe 137 to cylinder 90 to move ram 91 to the right and open the molds in a manner to be presently described. Simultaneously pump pressure is supplied through pipe 138 to move ram 53 to the left, thereby interrupting communication between the injection chamber and orifice 32. Also simultaneously therewith fluid is supplied through passages 139 and 140 to move rams 41 and 14 to the left. In this manner, the preheating and injection chambers are made immediately available for the next cycle, the thermoplastic material flowing by gravity from its hopper 10 into the preheating chamber. Ram 53 moves rapidly to the left by virtue of a spring-held relief valve 141 which permits fluid in the left end of cylinder 54 to be discharged into pipe 122 and thence through a check valve 143 and pipes 144 and 115, which latter pipe is now open to exhaust through a pipe 145. To initiate the next cycle of operation, it is necessary to reset hand lever 111 in the manner previously described.

*Stripping operation.*—When mold operating ram 91 starts its pullback movement to the right, Fig. 9, the various component elements of the mold structure initially move therewith as a unit due to springs 84 (Figs. 3, 4 and 5) forcing mold carrier 70 away from the face of housing 3. However, bolt head 86 (Fig. 4) limits movement of carrier 70 so that its final separation from housing 3 is only about, say, one inch. During the initial portion of this pullback movement, stripper arms 97 and 98 will be firmly held by springs 102 against the surface 100 of mold chase 92. Springs 102 are of sufficient strength to insure that a sprue breakerpin 165, Fig. 9, will pull on the sprue with sufficient force to break the same at the orifice and thereafter pull out the sprue 166 from its passage 120. It will be noted that the end of pin 165 has a suitably shaped undercut recess 167 in which plastic material is molded upon injection of material into the mold cavities. Pin 165 is carried by the stripper arm structure 97, 98 at the intersection thereof. Hence upon continued pullback movement of ram 91, stripper arms 97 will be moved against pins 104 and 105. Further pullback movement will result in the stripper arms remaining stationary and the mold chase 92 moving rearwardly over stripper pins 168 and pin 165, thereby causing the molded articles together with sprue 166 and gates leading therefrom to the articles to be ejected whereupon they drop to the bottom of the machine clear of the molds. The free end of pin 165 preferably terminates short of the mold face when the molds are closed, thereby permitting any small portion of hardened material within orifice 38 to be initially discharged into the space immediately adjacent the end of pin 165 without danger of such hardened material clogging any of the gates leading from the sprue passage. The plastic material which immediately follows the discharge of hardened material from orifice 38 will instantly fill up the undercut portion 167 and enclose the small hardened orifice core. A further function of rods 104 and 105 is to provide an adjustable limit stop for the pullback position of the mold operating ram 91. This ram is shown in its maximum pullback position in Fig. 4 wherein it contacts the cylinder head. However, if the mold structure should be of such dimensions that it would not be necessary to return the ram to its maximum pullback position, then rods 104 and 105 may be screwed to the left any desired distance. Thereupon platen 92 will be stopped when it engages the threaded shoulder portion of said screws. This function does not interfere in any way with the stripper operation previously described.

If it is desired to have successive operations automatically repeated, it is only necessary to manually release a latch 150 normally resting in a groove 151 formed in the rod of a piston 152. Thereupon a spring 153 will thrust piston 152 and its rod to the left into engagement with the stem 154 of valve 112 and accordingly shift the latter so as to start the cycle of operation in the manner as previously described in connection with the manual operation of lever 111. When spring 153 thus shifts valve 112, hand lever 111 will be moved and permit latch 113 to engage and hold the same in the manner as also previously described, it being understood that latch 113 is urged to its latched position by a spring or counterweight 155. When valve 112 shifts to the left to initiate press operation, pump pressure builds up in pipe 115 as previously described, and this pressure is transmitted through a pipe 156 to move piston 152 to the right, thus compressing spring 153. Piston 152 is held in its right position by a latch 157 which drops down into groove 151 when the crosshead 92 moves forwardly with ram 91 to close the molds, the latch being controlled by a pivoted follower arm 158 engaging a suitable cam 159 on said crosshead. A link 160 connects the latch with arm 158 while a counterweight or spring 161 urges the latch in a downward position. When the press has completed the injection operation as previously described, latch 113 is released by piston 134 and spring 135 shifts valve 112 to the right, thereby exhausting pressure from pipe 115. Pressure in pipe 156 also drops but piston 152 is held in its right position by latch 157. However, when the pullback cycle of the various rams is completed, cam 159 will have engaged follower lever 158 to cause release of latch 157. Thereupon spring 153 again moves piston 152 to the left to engage valve stem 154 and accordingly shift valve 112 to the left to restart the cycle of operations automatically. This automatic operation will continue indefinitely until latch 150 is manually thrown into a position to engage groove 151 and thus permanently hold piston 152 out of operation, whereupon the press will come to a complete stop.

Thermoplastic or other materials are produced in different colors and hence in changing over a machine from one color to another, it is desirable to clean those parts of the machine having contact with the material as otherwise the new color will be streaked by the old color. If the machine is not cleaned, then it is necessary to run an appreciable quantity of new colored material through the machine to carry away the former colored material. This results in a waste of material and time, although in certain types of machines this might be cheaper than dismantling the machine for physical cleaning. My machine is so constructed and arranged in an improved manner that the component parts in contact with the material are readily and conveniently accessible for thorough cleaning, all with minimum time and yet without impairing the maximum efficiency of operation or the economical manufacture and maintenance. This is accomplished by first arranging the valve mechanism 32, Figs. 3 and 10, so that when it is removed all of its parts may be readily cleaned and in addition direct access may be had to passage 22, Fig. 3. As shown in Fig. 10, valve 32 is journalled in a sleeve 175 normally held stationary by a vertical screw 176 extending upwardly through housing 3 from the bottom thereof, Fig. 3. The valve has a shaft one end of which is journalled as at 177 in a plug 178 while the other end abuts against plug 179. These plugs are insertable into suitable recesses from the sides of housing 3 and are held by any suitable bolts or screws 180. Pinion gear 45 bears against the inner end of plug 178. The valve shaft is thus held in a fixed axial position. Rack 46 extends upwardly through a slotted opening 181.

To clean the entire apparatus of injection material, it is only necessary, Fig. 3, to remove plug 178 whereupon valve 32 and its sleeve 175 may be bodily removed and separated from each other so as to provide convenient access to the valve passages 36 and 39, as well as to clean the valve surfaces and all other portions of the valve or valve chamber without difficulty. Next, screw 26, Fig. 3, s removed together with upward removal of wedge block 27 whereupon the central core 18 and sleeve 16 may be removed axially and separated from each other to expose all material contacting surfaces as well as to clean the left end of chamber 11. Upon removal of screws 26 and 176, Fig. 3, together with removal of core 18 and sleeve 16, it is seen that passage 22 is axially accessible from either end thereof, thereby permitting a straight rod with a clean rag or the like thereon to be inserted downwardly through the opening for screw 26 and into the passage 22 to discharge material therein through the opening for screw 176. Upon reassembling all of the foregoing elements the apparatus is then ready for injection of material of a new color without fear of contamination thereof. Hence it is seen that an extremely economical and yet highly efficient structure and mode of operation are provided.

It will of course be understood that various changes in details of construction and arrangement of parts may be made by those skilled in the art without departing from the spirit of the invention as set forth in the appended claims.

I claim:

1. Apparatus for molding material comprising, in combination, a mold, a preheating chamber for continuously heating material, an injection chamber adapted to receive material from said preheating chamber, means for moving material through said preheating chamber to said injection chamber, and means whereby said injection chamber receives from said heating chamber a definite quantity of heated material for each successive molding operation including a plunger for forcing material from said injection chamber into the mold and an adjustable screw for engaging said plunger to limit its return stroke and thereby determine the volumetric capacity of said injection machine.

2. Apparatus for molding material comprising, in combination, a preheating chamber, an injection chamber, means for forcing material through said preheating chamber into said injection chamber, an injection orifice, means for discharging material from said injection chamber through said orifice, and means operative to allow flow of material from said preheating chamber into said injection chamber while preventing communication between the injection chamber and said orifice and to prevent communication between said chambers when said injection chamber is in communication with said orifice.

3. Apparatus for molding material comprising, in combination, an injection orifice, an injection chamber, hydraulically operated means for filling said injection chamber by forcing material therein at an initially relatively rapid rate and finally at a relatively slow rate in accordance with the compressibility of the material, mechanism for closing said orifice during said filling operation and for opening the same thereafter, hydraulically operated means for discharging material from said injection chamber through said orifice, means for actuating said mechanism so as to effect said opening of the orifice only after a predetermined length of filling time, and means whereby upon opening of said orifice said hydraulically operated discharging means is rendered operative, said means for opening said orifice including a power operated lost motion connection.

4. Apparatus for molding material comprising, in combination, an injection orifice, an injection chamber, hydraulically operated means for forcing material into said injection chamber to fill the same, valve mechanism adapted to close said orifice during said filling operation and to open the same thereafter, hydraulically actuated means for operating said valve mechanism including a lost motion connection, hydraulically operated means for discharging material from said injection chamber through said orifice, means for gradually supplying operating fluid to said valve operating means during said filling operation thereby to take up the lost motion in said connection preparatory to opening said valve, and means whereby full head of operating fluid is thereafter supplied to said hydraulic valve actuating means and to said hydraulically operated means for discharging material from said injection chamber.

5. The combination set forth in claim 4 further characterized in that said hydraulically operated means for discharging material from said injection chamber is controlled by said valve actuating means.

6. Apparatus for molding material comprising, in combination, an injection chamber, a discharge orifice therefor, means for supplying material to said injection chamber, a rotatable valve having a T-shaped passage which in one position establishes communication between said injection chamber and said supply means and simultaneously prevents discharge of material through said orifice and in another position of said valve it closes said supply communication and opens said orifice.

7. Apparatus for molding thermoplastic material comprising, in combination, means forming a longitudinally extending injection chamber, means forming a laterally disposed preheating chamber, a transverse passage for establishing communication between said preheating and injection chambers, a core longitudinally positioned in said preheating chamber, removable flanged means slidable at substantially right angles to the axis of said core and disposed at one end thereof for holding the same in position in said preheating chamber and for permitting axial removal therefrom, and means allowing direct access to said transverse passage in a direction axially thereof and from a laterally exterior point of said chambers.

8. Apparatus for molding material comprising, in combination, an injection chamber, hydraulically operated means for discharging material from said injection chamber, a preheating chamber, hydraulically operated ram and cylinder means for forcing material through said preheating chamber and into said injection chamber, a mold operating ram and cylinder, a source of operating fluid pressure, control means for supplying operating fluid simultaneously to said mold operating ram and to said hydraulically operated means for forcing material through said preheating chamber whereby during the filling of said injection chamber a mold is closed, means for thereafter supplying operating fluid to said hydraulically operated means for discharging material from said injection chamber into the mold, a pressure release valve normally operative to prevent such injection operation, and means for controlling said release valve so as to initiate said injection operation after a predetermined pressure has been built up in said hydraulic cylinders to operate both said mold closing ram and said hydraulically operated means which forces material through the preheating chamber.

9. Injection molding apparatus comprising, in combination, a mold operating ram and cylinder, a hydraulically operated injection plunger and chamber therefor, a dual pressure pump, means for commonly supplying actuating fluid from the pump to said ram and injection plunger, and control means for causing said pump to supply a relatively high operating pressure to said ram and to supply actuating fluid at a lower pressure to operate said injection plunger.

10. The combination set forth in claim 9 further characterized by the provision of means for rendering said low pressure operation inoperative thereby to supply high operating pressure fluid to said ram and plunger.

CHARLES F. BURROUGHS.